3,145,114
PROCESS FOR INCREASING THE INDEX OF REFRACTION OF GLASS AND AN ARTICLE MADE THEREBY
Guy E. Rindone, State College, Pa. (% Prismo Safety Corporation, Huntingdon, Pa.)
No Drawing. Filed Oct. 24, 1960, Ser. No. 64,243
8 Claims. (Cl. 106—47)

The present invention relates to a process of increasing the index of refraction of glass and more particularly to the production of high titania glasses having desired increased indices of refraction.

Heretofore, in order to obtain glass of a particular index of refraction, it was necessary to change the composition by experimentation until the desired index glass was obtained. For many purposes today, glass is needed with a particular index of refraction, or in some cases with the highest index possible, preferably greater than 2.0.

In the past it has been known that if optical glass, high in silica content, were heat treated for long periods of time, the index refraction would be increased at most by 0.007.

For purposes of the present invention, where relatively large increases in index of refraction are needed, this change is insignificant.

Accordingly, it is an object of the present invention to provide a method of treating glass to increase its index of refraction in a relatively short period of time by approximately 0.1.

Another object of the present invention is to provide a method of treating a glass of a given composition to yield a desired index of refraction increase within the range of approximately 0.01 to 0.2 unit above its original index.

According to the present invention, it has been found that if a high $TiO_2$-containing glass is heat treated at temperatures in and above its annealing range, unusually large increases in index of refraction can be obtained for a given composition of glass depending on the temperature and time used. These increases in index of refraction can be produced without any loss in transparency, with no visible devitrification, or any effect on coloration in the glass. Thus, the present method is suitable for use for any purpose where transparency is a requirement.

Heretofore, in order to obtain high index glasses of approximately 2.0, the glass composition contained appreciable quantities of silicon dioxide and lead oxide. It should be noted that the present process is not applicable to such glasses.

The present process relates to the heat treatment of glasses containing a large percentage of titanium dioxide, preferably more than 30 mol percent. The preferred range of $TiO_2$ in the glass is 35.6–57.0 mol percent.

The temperature which is used in the heat treatment is not critical and varies with the composition of the glass and the time of treatment desired. If the temperature is below the annealing range, however, the desired change in index will not occur in a finite period of time. If a temperature too far above the annealing range is used, the glasses might crystallize and become opaque. The process appears to work best at temperatures at which the viscosity of the glass lies in the range of log viscosity (poises)=3 to 14, depending on the composition. The higher temperatures require less time to achieve a given index of refraction. Such temperatures may vary between 250° C. to 1200° C. depending on the composition. For titania-borate glasses the preferred temperature range is 400–1000° C.

The following examples illustrate the invention:

Example 1

A glass having a composition of:        Mol percent
$TiO_2$ _____ 43.2
$B_2O_3$ _____ 10.2
BaO _____ 34.3
ZnO _____ 12.3 was prepared by rapid quenching to produce transparent glass without devitrification taking place. The resulting glass was clear water white with a refractive index of 1.945. The glass was heated to 625° C. for 3 hours. The glass was now found to have an index of refraction of 2.05, an increase of over 0.1 unit.

The following table shows the index of refraction of this glass after various heat treatments:

| Temperature | Time, hrs. | Index of Refraction |
|---|---|---|
| 625° C | 0 | 1.945 |
| 625° C | 1 | 1.970 |
| 625° C | 2 | 2.030 |
| 625° C | 3½ | 2.050 |
| 625° C | 9 | 2.080 |
| 625° C | 26 | 2.10 |
| 600° C | 0 | 1.945 |
| 600° C | 6 | 1.960 |
| 600° C | 7 | 1.980 |
| 600° C | 8 | 2.000 |
| 600° C | 10 | 2.026 |
| 600° C | 15 | 2.050 |
| 600° C | 57 | 2.080 |
| 600° C | 150 | 2.100 |
| 575° C | 0 | 1.945 |
| 575° C | 50 | 1.960 |
| 575° C | 75 | 1.970 |
| 575° C | 80 | 1.980 |
| 575° C | 90 | 1.990 |
| 575° C | 100 | 2.010 |
| 575° C | 140 | 2.050 |
| 575° C | 200 | 2.100 |

Example 2

A glass having a composition:        Mol percent
$TiO_2$ _____ 49.2
$B_2O_3$ _____ 10.2
BaO _____ 28.3
ZnO _____ 12.3 was prepared by melting in a corrosion resistant refractory using an oxidizing furnace atmosphere. The molten composition was made into small transparent glass spheres by suspending small particles of the molten glass in air followed by a quick cooling. The spheres had an index of refraction of 1.995.

A heat treatment of this glass at various temperatures showed the following results:

| Temperature | Time, hrs. | Index of Refraction |
|---|---|---|
| 625° C | 1 | 2.05 |
| 625° C | 7 | 2.10 |
| 600° C | 37 | 2.05 |
| 600° C | 117 | 2.10 |
| 575° C | 139 | 2.05 |
| 575° C | 170 | 2.10 |

Other examples of transparent glass compositions which have been treated successfully in accordance with this invention are listed in applicant's Patent No. 2,939,797, entitled "Glass Compositions," which issued June 7, 1960. The invention is not limited to these compositions; however, since the process applies to all glass compositions having more than 30 mol percent $TiO_2$ that can be made into clear undevitrified glass.

Patent 2,939,797 gives the following preferred composition ranges to yield glass compositions suitable for making small glass beads:

|  | Mol percent |
|---|---|
| $TiO_2$ | 35.6–57.0 |
| BaO | 22.8–40.0 |
| $B_2O_3$ | 5.5–26.9 |
| ZnO | 0–20 |

Preferably, the sums of the mol percentages of the various ingredients should be in the following ranges:

|  | Mol percent |
|---|---|
| $BaO+TiO_2$ | 67.3–93.0 |
| $BaO+B_2O_3$ | 35.3–54.9 |
| $TiO_2+B_2O_3$ | 45.2–72.0 |
| $B_2O_3+ZnO$ | 7.0–32.7 |
| $BaO+TiO_2+ZnO$ | 73.1–94.5 |

The process may be applied to any shape and size of glass which may be made from these compositions in clear undevitrified form wherein the index of refraction is important.

It is particularly useful in connection with the manufacture of small transparent glass spheres for use as reflecting beads in traffic markers. It has been difficult and expensive to make glass beads having a refractive index of greater than 2.00. By use of the present invention, lower index glass can be readily made into glass having the desired index of refraction.

The heat treatment applied to the beads may be carried out in a number of ways. In the case of glass spheres, the heat treatment can be conducted immediately after manufacture as soon as the spheres have solidified, by placing heaters in the stack in which the spheres are dropping to maintain the spheres at the required temperature while they drop. Another method would be to reheat the cooled quenched glass at a later time after it has been made by use of furnaces or the like.

As indicated in the tables above, the rate of change of index of refraction increases rapidly with increasing temperature. Thus, by selecting the proper temperature, the index can be appreciably raised in a matter of seconds.

It is anticipated that this invention will find application in optical devices of all types requiring transparent glass components. This invention makes possible the manufacture of individual glasses which by proper treatment can develop a wide range of indices of refraction. It can be seen that the manufacturing costs compared to making glasses of different compositions in order to obtain different indices of refraction are substantially reduced. Also, glasses of higher index of refraction can be made more cheaply because the amount of the more expensive raw materials usually required for high index glasses is reduced.

The present method effects the increases in the index of refraction without any loss in transparency and without visible devitrification or any effect on coloration of the glass.

The explanation for these large increases in index of refraction with heat treatment are believed to be related to structural changes within the glass. It is known that $TiO_2$ and many compounds containing $TiO_2$ have high indices of refraction up to 2.90. During heat treatment, it is believed that structural groups are formed within the glass which closely resemble some of the crystalline forms or compounds of $TiO_2$ but without necessarily forming such crystals.

For example, X-ray diffraction analyses of the heat treated glasses given in Example 2 show no evidence of crystals being formed when the glasses were heated at 575° and 600° C. for periods up to 170 hours, the longest time studied, even though the index had increased from 1.99 to 2.10. Even at 625° C. there was no evidence of crystal formation at 4 hours while at 7 hours weak X-ray diffraction lines for the compound $BaTiO_3$ were found. Those crystals which formed between 7 and 24 hours at 625° did not decrease the transparency of the glass, possibly because their dimensions are smaller than the wave lengths of visible light, and/or their numbers are too few.

In the glass of Example 1, there is a more rapid formation of crystals as revealed by X-rays, crystalline X-ray patterns being obtained after heating for 2 hours at 625°, 12 hours at 600°, and 115 hours at 575°, although the glass remains transparent. The dominant crystalline phase was $BaTiO_3$ but some other unidentified crystals are present.

It is of interest to note that when borosilicate glasses are similarly heat treated, after thousands of hours the increase in index of refraction is measured only in the third decimal place.

It will be obvious to those skilled in the art that various changes may be made without departing from the spirit of the invention and therefore the invention is not limited to what is described in the specification but only as indicated in the appended claims.

What is claimed is:

1. A process for increasing the index of refraction of transparent glasses having a composition consisting essentially of the following ingredients in the mol percents indicated:

|  |  |
|---|---|
| $TiO_2$ | 35.6–57.0 |
| BaO | 22.8–40.0 |
| $B_2O_3$ | 5.5–26.9 |
| ZnO | 0–20 | which comprises heating such glass to temperatures at which the viscosity of the glass lies in the range of log viscosity (poises) equals 3–14 for a period of time until the index of refraction has increased by 0.01–0.2 unit, and then cooling the glass.

2. A process for increasing the index of refraction of transparent glass spheres having a composition consisting essentially of the following ingredients in the mol percents indicated:

|  |  |
|---|---|
| $TiO_2$ | 35.6–57.0 |
| BaO | 22.8–40.0 |
| $B_2O_3$ | 5.5–26.9 |
| ZnO | 0–20 | which comprises heating said spheres to temperatures at which the viscosity of the glass lies in the range of log viscosity (poises) equals 3–14 for a period of time until the index of refraction has increased by 0.01–0.2 unit, and then cooling the glass spheres.

3. A process for increasing the index of refraction of transparent glasses having the following composition:

|  | Mol percent |
|---|---|
| $TiO_2$ | 43.2 |
| $B_2O_3$ | 10.2 |
| BaO | 34.3 |
| ZnO | 12.3 | which comprises heating such glass to temperatures at which the viscosity of the glass lies in the range of log viscosity (poises) equals 3–14 for a period of time until the index of refraction has increased by 0.01–0.2 unit, and then cooling the glass.

4. A process for increasing the index of refraction of transparent glasses having the following composition:

|  | Mol percent |
|---|---|
| $TiO_2$ | 49.2 |
| $B_2O_3$ | 10.2 |
| BaO | 28.3 |
| ZnO | 12.3 | which comprises heating such glass to temperatures at which the viscosity of the glass lies in the range of log viscosity (poises) equals 3–14 for a period of time until the index of refraction has increased by 0.01–0.2 unit, and then cooling the glass.

5. Transparent glass articles made in accordance with the process of claim 1.

6. Transparent glass spheres made in accordance with the process of claim 2.

7. Transparent glass articles made in accordance with the process of claim 3.

8. Transparent glass articles in accordance with the process of claim 4.

References Cited in the file of this patent

UNITED STATES PATENTS

| | | |
|---|---|---|
| 1,814,012 | Taft | July 14, 1931 |
| 2,113,818 | Sullivan | Apr. 12, 1938 |
| 2,369,189 | Tillyer | Feb. 13, 1945 |
| 2,418,489 | Tillyer | Apr. 8, 1947 |
| 2,628,156 | Merker et al. | Feb. 10, 1953 |
| 2,713,286 | Taylor | July 19, 1955 |
| 2,777,255 | Merker | Jan. 15, 1957 |
| 2,790,723 | Stradley et al. | Apr. 30, 1957 |
| 2,859,560 | Wald et al. | Nov. 11, 1958 |
| 2,870,030 | Stradley et al. | Jan. 20, 1959 |
| 2,939,797 | Rindone | June 7, 1960 |
| 2,980,547 | Duval d'Adrian | Apr. 18, 1961 |
| 3,041,191 | Duval d'Adrian | June 26, 1962 |

OTHER REFERENCES

"Phase Diagrams for Ceramists," by Levin, McMurdie and Hall, published by the American Ceramic Society, Columbus, Ohio, 1956, Pages 14 to 34. A copy may be found in Div. 91 of the U.S. Patent Office.

"Handbook of Glass Manufacture," volume II, by Fay V. Tooley, published by Ogden Publishing Co., 55 West 42nd St., New York 36, N.Y., 1960. Pages 187 to 199. Also pages 3 to 9. A copy may be found in Division 91 of the U.S. Patent Office.